Oct. 10, 1933.          C. E. PHILLIPS          1,929,648
              FRAME SPACER FOR BEEHIVES
                 Filed Oct. 2, 1931          2 Sheets-Sheet 1
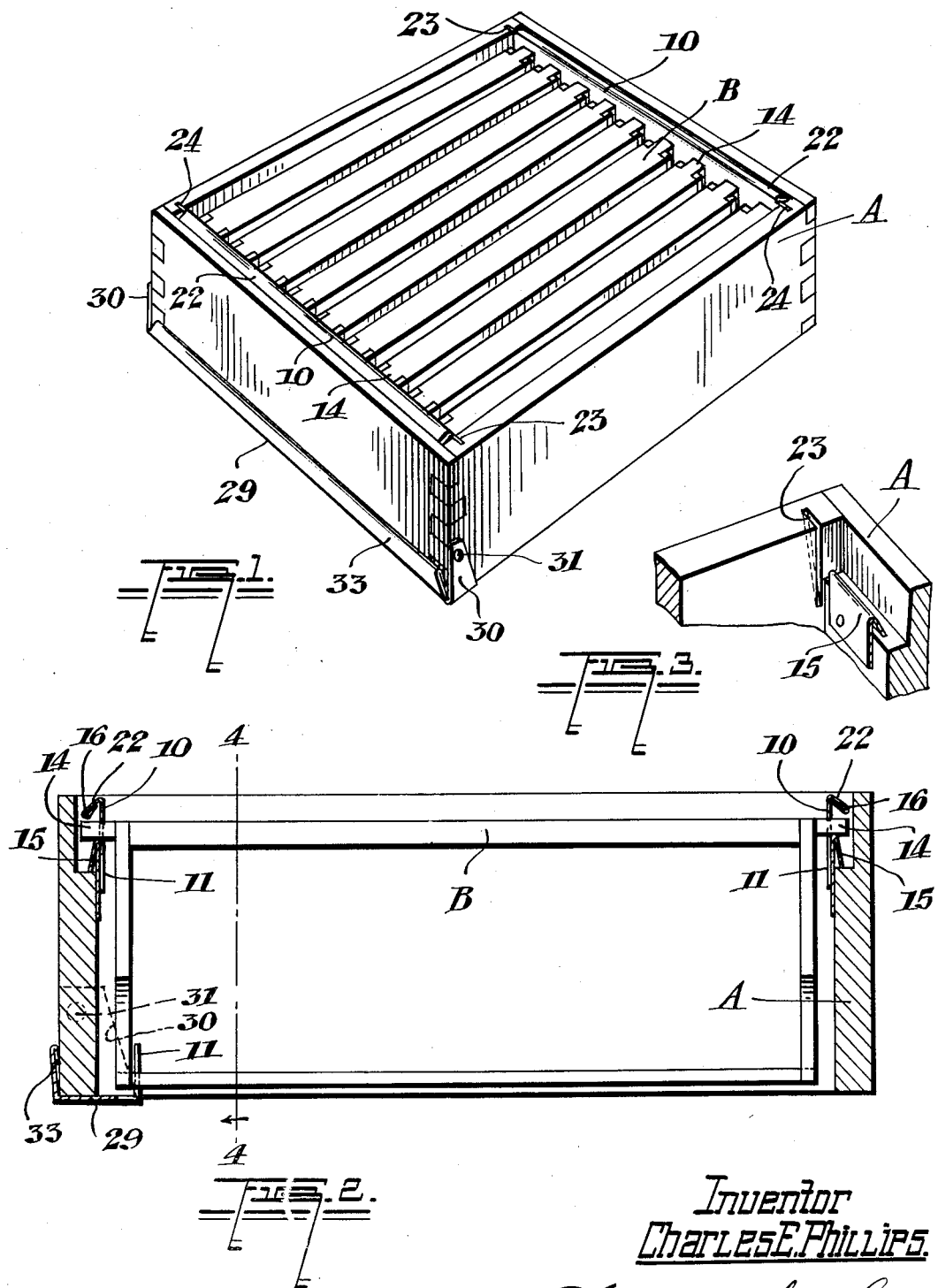
Inventor
Charles E. Phillips.
BY [signature]
ATTYS.

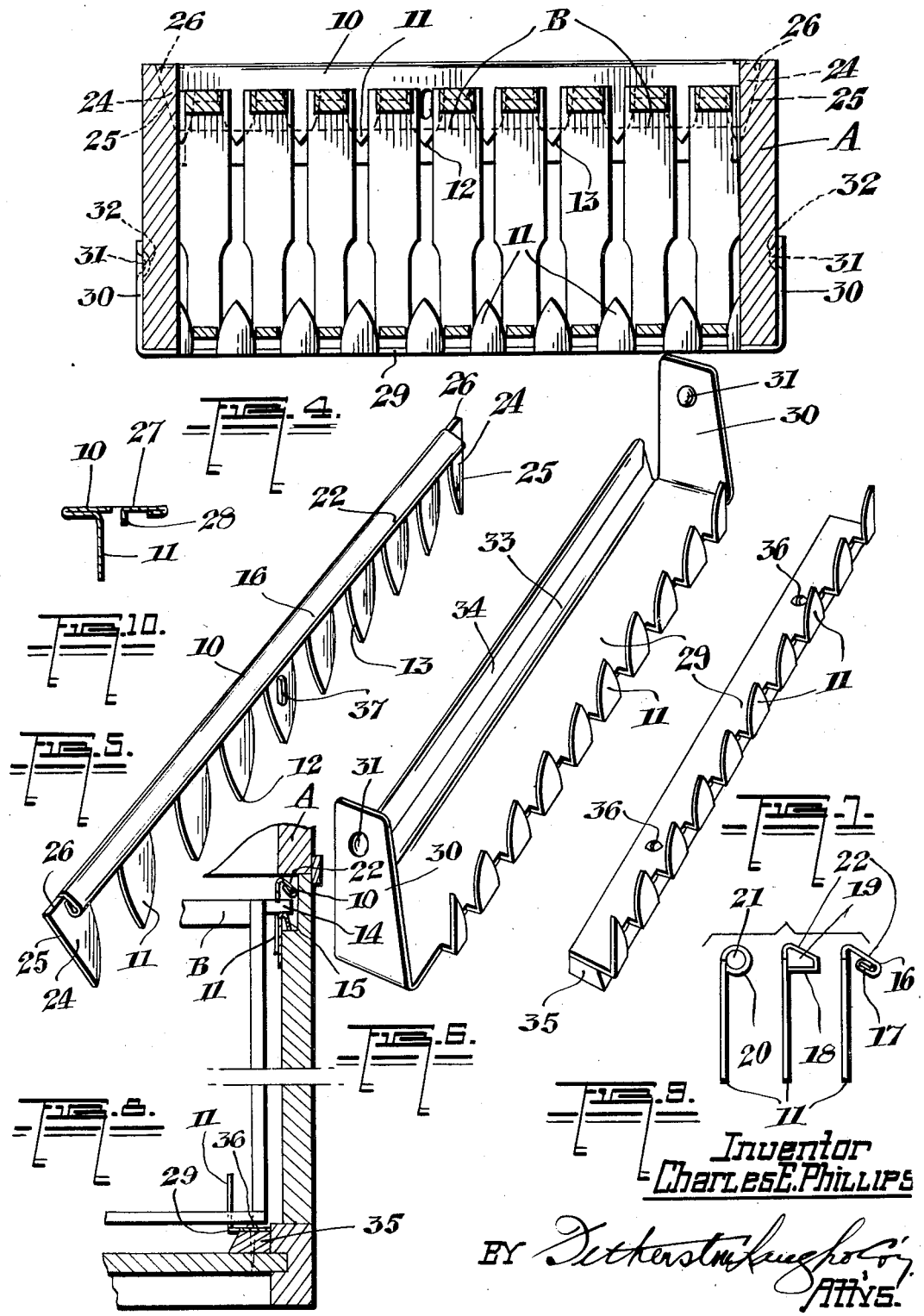

Patented Oct. 10, 1933

1,929,648

UNITED STATES PATENT OFFICE 1,929,648

FRAME SPACER FOR BEEHIVES

Charles Errett Phillips, Saskatoon, Saskatchewan, Canada

Application October 2, 1931. Serial No. 566,459

6 Claims. (Cl. 6—2)

This invention relates to frame spacers for bee hives and more particularly to metal frame spacers.

There are several styles of bee hives in use, the one used most generally being the Langstroth hive equipped with Hoffman self-spacing frames. The so-called Hoffman self-spacing frames include the provision of a projecting member on the sides of the frames at each end thereof, which are adapted to contact with the adjacent spacing member to space the frames. Usually about ten frames are placed in the hive body and a space of about one inch is left, if the frames are pushed tightly together against one side of the hive. The extra space is provided to accommodate increasing width of the spacer bars, which is caused by the deposit thereon of a resinous substance called propolis.

Primarily therefore, this method of spacing is very unsatisfactory, since provision has to be made for an increase in the width of the frames, the frames are not equidistantly spaced, and since they are only spaced apart by a bearing engagement between the spacing members carried on the upper portions of adjacent frames, the frames may swing and move relatively, when a hive, super or the like is being transported or moved.

Apart from this, due to unequal spacing as above described, it is necessary to spend considerable time to arrange the frames to absorb the extra space provided, and it also requires further time and effort to scrape and clean the frames from deposited propolis, which often causes the frames to stick within the hive or super.

According to the present invention, these disadvantages are entirely avoided, and it is an object of the invention to provide means for firmly holding the frames of bee hives, brood chambers or honey supers equidistantly from each other, without requiring a special spacing operation.

A further object of the invention is to firmly hold the frames in spaced relationship as referred to, so that the supers or the like may be changed from one location to the other without disturbing the frames or bees.

A further object of the invention is to provide spacing means, which will at the same time prevent the bees from depositing propolis on or around the ends of the top bar of the frames or on the frame supporting portions of the hives.

A further object of the invention is to provide spacing means of the character referred to, of a very simple construction, which may be readily inserted or removed from the hives, supers or the like without any difficulty.

A further object of the invention is to provide a spacer of this character, which may be adapted to equally space any number of frames according to the size of the hive.

With these and other objects in view, the invention consists essentially of spacing members in the form of a bar of suitable material, preferably metal, which is provided with a plurality of projecting teeth, cut to an apex, and preferably formed semi-elliptical around the projecting edges, the teeth being adapted to operate between the frames of the hive, super etc., to hold them in spaced relation in addition to functioning to shut off the bees from contact with the frame ends in conjunction with the general formation of the spacer.

In this construction, means is provided for retaining the spacing elements in their mounting between the frames, means for covering the ends of the frames and the frame supports, with the provision of a spacing element at the bottom of the hive, super etc., cooperating with the spacers in the top of the hives, supers etc., to maintain the frames in a definite fixed position in their mounting, as more fully described in the following specification, and illustrated in the accompanying drawings, which form part of the same.

In the drawings;

Figure 1 illustrates a perspective view of a hive super illustrating the frame's position therein in spaced relationship and held apart by spacers in the top thereof, and also illustrating the position of a bottom spacer for the super.

Figure 2 is a transverse section taken through a super illustrating a frame mounted therein and the position of the spacers relative thereto.

Figure 3 is a fragmentary perspective view of one corner of the super illustrating the supporting ledge for the frames and a slot formed in one side of the super adapted to hold the spacers when inserted.

Figure 4 is a transverse section taken through the hive at a ninety degree angle to Figure 2, illustrating a plurality of frames in the super and the spacers mounted in operative position to space the frames apart.

Figure 5 is a perspective view of one form of metal spacer illustrating the spacing teeth and projecting flange of suitable form.

Figure 6 is a perspective view of the spacer for the bottom of the super illustrating the means for detachably connecting said spaced with the super body.

Figure 7 is an alternative form of bottom spacer which may be employed as particularly adaptable for use in the hive proper generally designed to be secured to the floor board of the hive.

Figure 8 is a fragmentary section taken through a hive showing part of the super mounted thereabove and indicating with the hive a supported frame, the relation of the spacers thereto and illustrating the placement of the form of spacer indicated in Figure 7.

Figure 9 is an end elevation of three different forms of metal spacers which may be employed, and Figure 10 is a sectional view of an alternative form of spacer.

Referring more particularly to the drawings, A indicates a hive super and B indicates a plurality of frames mounted therewithin. These frames, as well known, are designed to carry the honey combs and are usually spaced from one another within a super or hive by means of projections formed on the edges of the frames adapted to contact with one another and hold these frames in definite spaced relationship.

According to my invention, I employ definite removable spacing members generally indicated in the drawings by the numeral 10. These spacers are formed with a plurality of projecting teeth 11, which are pointed as at 12, and may be of any desirable form, but preferably are substantially semi-elliptical, being provided with the rounded edges 13. The teeth are uniformly spaced apart on the spacer 10 and are designed to be inserted between the projecting supporting ends 14 of the frames B, which normally rest upon the projecting support 15 formed within the hive or super wall.

The upper portions of the spacers or spacer body 10 are provided with a longitudinally extending rib, bar or flange 19, which may be of any desirable form, such as a plain strip or flange of one thickness of metal bent from the spacer body substantially at right angles thereto, or of a form indicated in Figure 9 including a turned in reinforced edge 17, a bent reinforced shoulder 18 provided with a core 19, or a rolled shoulder 20, which may be provided with a core 21. These ribs, flanges or shoulders 16 are preferably formed integral with the spacer 10 and in preferred form are inclined to the horizontal, being slightly downwardly bent to provide the inclined face 22.

As indicated particularly in Figure 2, the rib, shoulder or the like 16 will project over the supporting ends 14 of the frames B, and also over the supporting portion of the super hive or the like including the projecting support 15, so that the deposition of propolis upon the ends of the frames or upon the supporting portions of the super or hive body is directly prevented. This will effect a great advantage in the industry, since it entirely obviates scraping of the frame ends to remove a deposited material, and also renders the frames and supporting body more convenient to handle.

Two of these spacers are employed in the upper portion of the hive or super, as indicated in Figure 1, and according to my invention, means are provided to hold these spacers within the super or hive body from lateral movement.

Any suitable means may be employed, but preferably slots 23 are cut in the wall of the supporting body, adjacent the frame supporting portion of the hive etc., within which the end teeth 24 are designed to project, so that the spacers 10 when inserted within the supporting body are rigidly retained therein and can only be removed therefrom by pulling them upwardly.

The end teeth 24 may be formed in any desired manner to permit the firm retention of the frames against movement. It is preferred to form these teeth with an inclined straight edge 25, virtually providing a distinct projection 26 on the ends of the spacers 10, between the straight edge 25 of the end teeth 24, and the termination of the rib 16 formed on the spacer, and the slots 23 are designed to correspond with the shape of the projections 26. This mode of retaining the spacers 10 from movement after mounting in the supporting body may be varied. For instance in Figure 10, I have disclosed a spacing member 10, which is provided with teeth 11 bent from the metal, the spacer being provided with a flat surface 27. From this flat surface, portions may be stamped out at intervals to provide downwardly projecting lugs 28, which will readily fit over the projecting support 15 on the hive body etc., so that lateral movement of the spacer is prevented, the teeth 11 abutting the support 15 on one side, and the lugs 28 abutting the support on the other side.

Propolis may possibly be deposited upon the spacers, but since these spacers are readily removable, they may be dipped in a dissolving liquid, which will dissolve this deposited substance, and the spacers cleaned without any particular effort.

It is conceivable however that the propolis if deposited on the frames and between the faces of the frame and the super, which is the only available place for the deposit, so as to cause the frame to stick to the base of the super, upon the insertion of a hive tool, screw driver or the like between the joint of the super and the hive, to remove the super, the tool will bear against or extend over the sloped surface 22 of the frame spacer or the rounded surface of the spacer, if it is formed with a rounded rib, and upon lifting the super, contact between the tool and the rib will prevent the spacer from being lifted with the super.

In order to secure the frames against swinging movement and thereby hold them quite rigidly within the supporting body, a cooperating spacer 29 is positioned in the bottom of the hive or super, constructed of the same general form as the spacers 10, being provided with teeth 11, which are formed in the same manner and of course spaced to correspond with the teeth in the upper spacers.

In constructing a spacer for the bottom of a super, I preferably employ the form shown in Figure 6, which includes the body portion 29 and teeth 11, the body portion being provided with the upwardly extending extensions 30, which are designed to extend along the outer walls of the super as indicated in Figure 4. These upwardly extending extensions 30 are depressed in an area to form the protuberances 31, which normally are designed to enter recesses or depressions 32 in the outer walls of the supers, (see Figure 4), so that due to the fact that these extensions are somewhat resilient, when the bottom spacer is mounted upon the super, the protuberances 31 will readily enter the recesses or depressions 32, and firmly retain the bottom spacer in correct position upon the super. This is clearly indicated in Figure 4.

As indicated in Figure 6, the body or spacer 29 is provided with a flange 33 bent substantially at right angles from the body 29 and preferably formed with a turned in reinforced edge 34, the flange 33 being designed to extend along one of the outer walls of the super as indicated in Figure 1, and thus provides a general reinforcement for the edge of the super as well as functioning as a spacer element. Apart from this, the flange 33 in engaging with the outer wall of the super will definitely prevent the spacer from moving laterally within the super, so that this flange also constitutes means for preventing the bottom spacer from abnormal movement.

A similar form of spacing element could be provided in the hive proper by simply eliminating the flange 33, and forming the extensions 30 in such a manner as to contact with the inner walls of the hive. However, it may be found more desireable to employ a spacer of a form shown in Figure 7, and illustrated in position in Figure 8, including the body 29, and teeth 11 of similar form, the whole being connected to a mounting bar 35, which may be mounted within the bottom of the hive and secured thereto by means of screws or the like 36, which may also be used to firmly retain the spacing member 29 upon the mounting bars 35. The spacing elements of course cooperate with one another, the upper spacing elements uniformly spacing the top portions of the frames and holding them in a rigid position, while the bottom spacing elements will function similarly and hold the frames against a rocking movement, which would otherwise be the case if only upper spacers were employed.

It will be readily seen particularly by reference to Figure 8, that in spacing the frames, the form and position of the spacers will prevent the bees from getting into that portion of the hive or super above the ends of the frames or above the frame supporting portions of the hives or supers, the spacers constituting in effect a wall of metal along the inner marginal edge of the hive or super. This of course as previously referred to, will definitely obviate the deposition of propolis upon the ends of the frames or supports for the frames, but should a bee at any time, through some unaccountable way get in between the upper marginal edge of the hive or super and the spacers through the provision of an orifice 37 in one of the teeth of the spacers, the trapped bee or bees may escape back into the hive.

Various modifications may be made in the invention without departing from the spirit thereof or the scope of the claims, and therefore, the exact forms shown are to be taken as illustrative only and not in a limiting sense, and I desire that only such limitations shall be placed thereon as are imposed by the prior art or are specifically set forth in the appended claims.

What I claim as my invention is:—

1. A frame spacer for bee hives comprising a body portion formed with a plurality of uniformly spaced, projecting teeth, and a longitudinally extending outstanding rib projecting from the body portion substantially at right angles thereto and terminating intermediate the ends of the body portion to permit said ends to co-operate with the hive structure.

2. A frame spacer for bee hives comprising a body portion formed with a plurality of uniformly spaced projecting teeth, and a longitudinally extending outstanding rib laterally projecting from the body portion, said rib extending substantially the length of the body portion which is formed with projections at each end adapted to co-operate with the hive structure to prevent abnormal movement of the spacer.

3. A device as claimed in claim 2 in which the projections are in the form of extensions of the end teeth of the spacer, said end teeth being formed with a straight inclined edge.

4. A frame spacer for bee hives comprising a body portion formed with a plurality of uniformly spaced, projecting teeth designed to extend between adjacent frames within the hive, and means on said spacer adapted to project over the ends of said frames to prevent the deposition of foreign substances on said ends.

5. A device as claimed in claim 4 in which the spacer is formed with means for retaining it in a set position within the hive.

6. In a beehive structure the combination of a housing designed to carry a plurality of frames and a removable frame spacer including a body portion formed with uniformly spaced projecting teeth and a longitudinally extending rib projecting from said body portion and terminating intermediate the ends of said body portion forming projecting ends therefor, said housing being formed with slots to receive said projecting ends of the body portion.

CHARLES ERRETT PHILLIPS.